United States Patent [19]
Kuwajima et al.

[11] Patent Number: 5,057,156
[45] Date of Patent: Oct. 15, 1991

[54] METALLIC PIGMENT COMPOSITION AND WATER BORNE COATING COMPOSITION THEREOF

[75] Inventors: Teruaki Kuwajima, Higashiosaka; Satoru Nagahata, Tokyo; Sakuichi Konishi, Ikoma, all of Japan

[73] Assignee: Nippon Paint Co., Ltd., Osaka, Japan

[21] Appl. No.: 502,771

[22] Filed: Apr. 2, 1990

[30] Foreign Application Priority Data

Mar. 31, 1989 [JP] Japan ................................. 1-82368

[51] Int. Cl.$^5$ .......................... C09C 1/62; C09C 1/64; C09C 3/08
[52] U.S. Cl. ................. 106/403; 106/14.12; 106/14.15; 106/287.17; 106/287.23; 106/287.24; 106/287.25; 106/287.29; 106/404; 106/499; 106/503
[58] Field of Search ............... 252/545, 171, 389.21, 252/400.21, 400.22; 106/462, 404, 403, 443, 431, 448, 477, 503, 504, 287.17, 218, 219, 287.29

[56] References Cited

U.S. PATENT DOCUMENTS

| | | | |
|---|---|---|---|
| 2,545,357 | 6/1946 | Jayne | 252/526 |
| 3,151,137 | 9/1964 | Young et al. | 252/171 |
| 3,918,984 | 11/1975 | High et al. | 106/404 |
| 4,292,087 | 9/1981 | Bell | 106/404 |
| 4,350,535 | 9/1982 | Ishijima et al. | 106/404 |
| 4,484,951 | 11/1984 | Uchimura et al. | 106/404 |
| 4,725,317 | 2/1988 | Wheeler | 106/404 |
| 4,869,754 | 9/1989 | Kawabe et al. | 106/404 |

Primary Examiner—William R. Dixon, Jr.
Assistant Examiner—Scott L. Hertzog
Attorney, Agent, or Firm—Wenderoth, Lind & Ponack

[57] ABSTRACT

Disclosed is a metallic pigment composition which is stably dispersed in a water borne coating composition and which also provides with smooth coatings having superior water resistance. The metallic pigment composition comprises a metallic pigment and a phosphorous compound represented by the following formula (I) or (II);

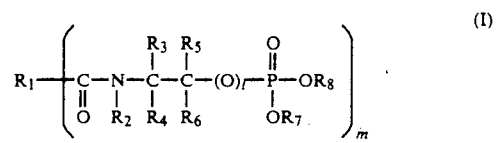

wherein l and 0 or 1, m is an integer of 1 to 4, $R_1$, $R_2$ $R_7$ and $R_8$ represent aliphatic, alicyclic or aromatic hydrocarbon groups which are the same or different, selected from a hydrogen atom, a $C_1$–$C_{24}$ aliphatic hydrocarbon group, a $C_3$–$C_{24}$ alicyclic hydrocarbon group or a $C_6$–$C_{24}$ aromatic hydrocarbon group, and $R_1$ has a valence of m, $R_3$, $R_4$, $R_5$ and $R_6$, which are the same or different, represent $C_1$–$C_3$ aliphatic hydrocarbon group or a $C_6$ or $C_7$ aromatic hydrocarbon group,

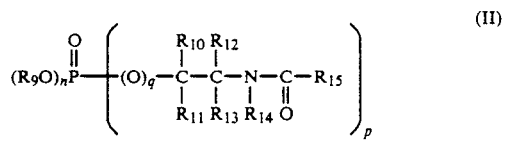

wherein n is 0, 1 or 2, p is an integer of 1 to 3, n+P equals 3, q is 0 or 1, $R_9$, $R_{14}$ and $R_{15}$, which are the same or different, represent a hydrogen atom, a $C_1$–$C_{24}$ aliphatic hydrocarbon group, a $C_3$–$C_{24}$ alicyclic hydrocarbon group or a $C_6$–$C_{24}$ aromatic hydrocarbon group, $R_{10}$, $R_{11}$, $R_{12}$ and $R_{13}$, which are the same or different, represent a $C_1$–$C_3$ aliphatic hydrocarbon group or a $C_6$ or $C_7$ aromatic hydrocarbon group;

the phosphorus compound being present in an amount of 0.5 to 200 parts by weight based on 100 parts by weight of the metallic pigment.

The present invention also provides a water borne coating composition which contains the metallic pigment composition.

6 Claims, No Drawings

METALLIC PIGMENT COMPOSITION AND WATER BORNE COATING COMPOSITION THEREOF

FIELD OF THE INVENTION

The present invention relates to a metallic pigment composition and a water borne coating composition which contains the same.

BACKGROUND OF THE INVENTION

A paint which contains metallic pigment, such as powdered or flaked aluminum, provides the surface with a metallic luster. Most of the metallic paints are organic solvent based, but have problems in environmental pollution, working conditions and the like. Accordingly, it has been proposed and studies made to substitute water for the organic solvent.

Water, however, creates different problems. Thus, the metallic pigment is vigorously reacted with water to produce hydrogen gas which is dangerous and may cause an explosion. The problems are more serious in the automotive industries, because paint is generally stored in a closed container for a long period of time before using it.

In order to obviate the above problems, it has been proposed in Japanese Kokai Publication (unexamined) 168663/1983 to surface treat a metallic pigment with a certain organic phosphate to render its surface hydrophobic. The proposed method, however, often gives rise the agglomeration of the metallic pigment, which adversely affects the surface smoothness of the coated surface and deteriorates the adhesive properties. A large amount of a surfactant is added to the proposed coating composition to improve the above problems, but the surfactant decreases the water resistance of the coatings.

SUMMARY OF THE INVENTION

The present invention provides a metallic pigment composition which is stably dispersed in a water borne coating composition and which also provides with smooth coatings having superior water resistance. The metallic pigment composition comprises a metallic pigment and a phosphorus compound represented by the following formula (I) or (II);

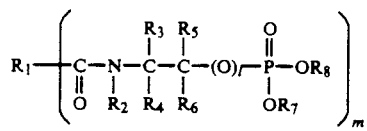

wherein $l$ is 0 or 1, m is an integer of 1 to 4, $R_1$, $R_2$ $R_7$ and $R_8$ represent aliphatic, alicyclic or aromatic hydrocarbon groups which are the same or different, selected from a hydrogen atom, a $C_1$–$C_{24}$ aliphatic hydrocarbon group, a $C_3$–$C_{24}$ alicyclic hydrocarbon group or a $C_6$–$C_{24}$ aromatic hydrocarbon group, $R_1$ has a valence of m, $R_3$, $R_4$, $R_5$ and $R_6$, are the same or different, and represent a $C_1$–$C_3$ aliphatic hydrocarbon group or a $C_6$ or $C_7$ aromatic hydrocarbon group,

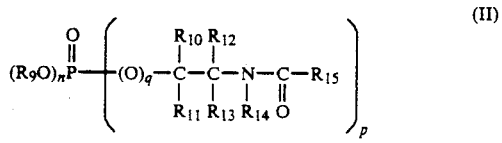

wherein n is 0, 1 or 2, p is an integer of 1 to 3, n+P equals 3, q is 0 or 1, $R_9$, $R_{14}$ and $R_{15}$, which are the same or different, represent a hydrogen atom, a $C_1$–$C_{24}$ aliphatic hydrocarbon group, a $C_3$–$C_{24}$ alicyclic hydrocarbon group or a $C_6$–$C_{24}$ aromatic hydrocarbon group, $R_{10}$, $R_{11}$, $R_{12}$ and $R_{13}$, which are the same or different, represent a $C_1$–$C_3$ aliphatic hydrocarbon group or a $C_6$ or $C_7$ aromatic hydrocarbon group;

the phosphorus compound being present in an amount of 0.5 to 200 parts by weight based on 100 parts by weight of the metallic pigment.

The present invention also provides a water borne coating composition which contains the metallic pigment composition mentioned above.

DETAILED DESCRIPTION OF THE INVENTION

The phosphorus compound (I) or (II) may be prepared according to the following chemical equations [A], [B] or [C];

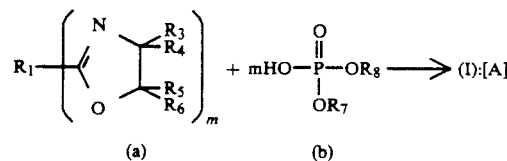

wherein $R_1$, $R_3$–$R_8$ and m are the same as mentioned above, $R_2$ is a hydrogen atom and $l$ is 1,

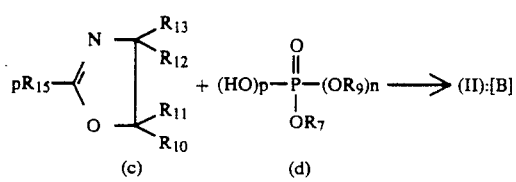

wherein $R_9$–$R_{13}$, n and p are the same as mentioned above, $R_{14}$ is a hydrogen atom and q is 1,

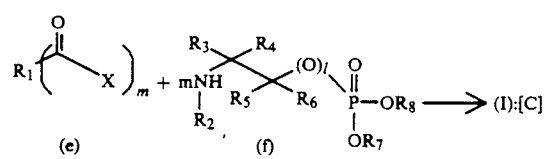

wherein $R_1$–$R_8$, $l$ and m are the same as mentioned above, and X is a halogen atom.

The starting materials (a) and (c) of the above equations are oxazoline compounds which are commercially available or are prepared by art-known methods, such as a condensation reaction of a carboxylic acid and 2-hydroxyethylamine. Typical examples of the material (a) and (c) are oxazolines which have an aliphatic or alicyclic group, such as 2-methyl-2-oxazoline, 2-ethyl-2-oxazoline, 2-n-propyl-2-oxazoline, 2-isobutyl-2-oxazoline, 2-n-octyl-2-oxaline, 2-lauryl-2-oxazoline, 2- cyclohexyl-2-oxazoline, 5,5-dimethyl-2-oxazoline, 2,2'-tetramethylenebis-(4,4-dimethyl-2-oxazoline) and the like; oxazolines which have a aromatic group, such as 2-phenyl-2-oxazoline, 2,5-diphenyl-2-oxazoline, 5-phenyl-2-oxazoline, 2,2'-m-phenylenebis-2-oxazoline, 2,2'-p-phenylenebis-2-oxazoline, 2,2'-p-phenylenebis-2-oxazoline and the like.

The starting materials (b) and (d) can be phosphoric acid or a phosphate having at least one phosphoric hydroxyl group. The materials can be commercially available or prepared by art-known methods. Typical examples of the materials (b) and (d) are orthophosphoric acid; phosphates, such as mono- r di-butyl phosphate, mono- or di-pentyl phosphate, mono- or di-hexyl phosphate, mono- or di-heptyl phosphate, mono- or di-octyl phosphate, mono- or di-lauryl phosphate, mono- or di-phenyl phosphate, mono- or di-nonyl phosphate, mono- or di-benzyl phosphate and the like.

The starting material (e) of the above equations is a compound which has at least one acyl halide and can be commercially available or prepared by art-known methods, for example by the reaction of a carboxylic acid with thionyl chloride or phosphorus pentachloride. Typical examples of the materials (e) are n-butyl chloride, n-octyl chloride, lauryl chloride, benzoyl chloride, n-butylyl chloride, i-butylyl chloride, iso-valeroyl chloride, n-valeroyl chloride, n-caproyl chloride, enanthyl chloride, n-caprilyl chloride, 2-ehtylhexanoyl chloride, n-capryl chloride, n-dodecanoyl chloride benzoyl chloride and the like.

The starting material (f) of the equations is a phosphoric acid, a phosphate, phosphorous acid or a phosphite which has at least one primary or secondary amino group. The material can be commercially obtained and may be prepared by art-known methods, for example, by the method suggested in Japanese Patent Application Ser. No. 157651/1988, a method wherein 1,3,2-dioxaphosphorane is ring-opened with amine, a method wherein an aminoalcohol is esterified with phosphoric acid or a phosphorous compound or a method wherein a vinyl phosphate and an amine is michael-added. Examples of the materials (f) are an aminophosphate (l=1), such as mono-2-laurylaminoethyl phosphate, 2-(dodecylaminoethyl octylphosphate, 2-stearylaminoethyl butylphosphate and 2-(n-butylamino)ethyl p-nonylphenylphosphate; an aminophosphorous acid (l=0), such as 2-(dodecylaminoethyl-phosphorous acid and the like; an aminophosphite (l=0), such as 2-(dodecylamino)ethyl monooctylphosphite, 2-(n-butylamino)ethyl monostearylphosphite, 2-(stearylamino)ethyl mono-n-butylphosphite and 2-(octylamino)ethyl mono-2-(chloroethyl)phosphite; and the like.

The reactions [A] and [B] are known in the art and can generally be conducted at a molar ratio of one or more moles of a phosphoric hydroxide group of the material (b) based on one mole of an oxazoline of the material (a), (b) or (c), preferably a molar ratio of 1:1 to 1:10. The reaction can be conducted at temperatures above more than room temperature, preferably 50 to 120° C. in the presence or absence of a solvent. The termination of the reaction can be realized by determining the acid value, but generally the reaction is terminated in more than 10 minutes, preferably 10 to 120 minutes. The solvent used in the reaction includes an aromatic hydrocarbon, such as toluene and xylene; a halogenated hydrocarbon, such as chloroform; an ether, such as dioxane; and the like. A catalyst, such as p-toluenesulfonic acid, may also be added to the reaction solution.

The reaction [C] is also known to the art and can be carried out at a molar ratio of m moles of the material (f) to one mole of the material (e). It may be conducted in a solvent at a temperature of -50° C. to room temperature for 10 minutes to 5 hours. An organic amine, such as triethylamine etc. may be added thereto to trap the by-product hydrochloric acid. The solvent suitable for the reaction [C] includes an ether, such as tetrahydrofuran and dioxane; a hydrocarbon, such as toluene; and the like. The solvent may be present in the reaction system in an amount of 0.1 to 100 parts by weight, preferably 0.5 to 10 parts by weight based on one part by weight of the material (e).

Also, the phosphorus compound (II) of the present invention may be prepared according to the following action equation [D];

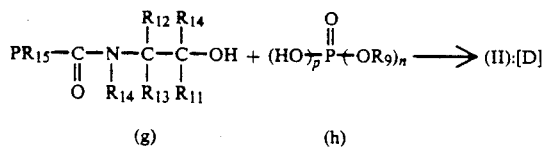

(g)  (h)

wherein $R_9$ to $R_{15}$, n and p are the same as mentioned above and q=1.

The starting material (g) is commercially obtainable or may be prepared by art-known methods, for example by the reaction of a halogenated compound and 2-hydroxyethylamine. Typical examples of the materials (g) are N-(2-hydroxyethyl)propionamide, N-(2-hydroxyethyl)octylamide, N-(2-hydroxyethyl)laurylamide, N-methyl-N-(2-hydroxyethyl)propionamide, N-(2-hydroxybutyl)laurylamide and the like. The material (g) is the same as the material (b). The equation [D] is an esterification reaction wherein q mole(s) of the hydroxyamide compound (g) is reacted with one mole of the phosphoric compound having p hydroxyl groups. The reaction may be carried out in a solvent at a temperature of 100° to 250° C., preferably 150° to 200° C. for 30 minutes to 10 hours, preferably 1 to 3 hours. The solvent to be used in the reaction includes toluene, xylene and the like.

The metallic pigment employed in the present invention is one which is generally used in this field, for example aluminum, gold bronze, gold, iron, stainless steel, nickel, zinc, tin, chromium, lead, bismuth, an alloy thereof and the like. Preferred is aluminum. The metallic pigment can take any form, such as powder and flakes, but flakes are preferred.

The metallic pigment composition of the present invention may be prepared by any method, as long as the metallic pigment is contacted with the phosphorus compound (I) or (II). For example, when the metal is ground, the phosphorus compound may be added thereto solely or together with a solvent or a grinding agent. Also, a metallic pigment paste which generally contains a metallic pigment and a solvent may be prepared by an art-known method and then mixed with, the phosphorus compound. Further, after removing the solvent and a grinding agent from the metallic pigment paste which contains a metallic paint, a solvent and a grinding agent, the isolated metallic pigment may be mixed with the phosphorus compound. The solvent to be used for producing the metallic pigment composition or the pigment paste includes mineral spirit, solvent naphtha and the like. The grinding agent includes an unsaturated fatty. acid, a fatty acid, a fatty amide and the like. The amount of the phosphorus compound in the composition can be varied depending on the nature of the metallic pigment, on the nature of the contacting process and the like, but generally is within the range of 0.5 to 200 parts by weight, preferably 1 to 100 parts by weight, based on 100 parts by weight of the dried metallic pigment. Amounts greater than 200 parts by weight do not increase technical effects in proportion to the excess amounts thereof. Amounts of less than 0.5 parts by weight result in a deterioration of stability.

The metallic pigment composition may be combined with an aqueous film forming polymer to form a water borne coating composition. The aqueous film forming polymer is one which is generally known in the art, for example, acryl resins, polyesters, alkyds and the like. The polymer, if necessary, is made water soluble or water dispersible by general methods, such by neutralization with ammonia or an amine. The water borne coating composition of the present invention may contain other components, such as non-metallic pigments crosslinking agents, thickening agents and fillers. The coating composition can be applied by any coating processes, such as spray coating, dipping, electrocoating and the like. The metallic pigment composition is generally contained in the coating composition in an amount of 1.0 to 100 parts by weight based on 100 parts by weight of the aqueous film forming polymer. Amounts of the other components can be varied within a wide range.

The metallic pigment composition of the present invention is stably dispersed in a water borne coating composition which provides smooth coatings having superior water resistance.

EXAMPLES

The present invention is illustrated by the following Examples which, however, should not be construed as limiting the present invention to the details thereof.

PRODUCTION EXAMPLE 1

A flask equipped with a stirrer and a thermometer was charged with 10 parts by weight of 2,2'-m-phenylenebis(2-oxazoline), 52.6 parts by weight of mono- and di-2-ethylhexylphophate having a molar ratio of mono-ester / diester of about 1/1 and an acid value of 324 KOH mg/g and 50 parts by weight of toluene and heated to 80° C. with stirring to form a transparent solution. After reacting at 80° C. for 2 hours, toluene was removed under reduced pressure to obtain a product of 62.6 parts by weight (acid value 209 KOH mg/g). An IR spectrum shows an absorption of 1,540 cm$^{-1}$ (amide group) to prove that the product is a mixture of the starting materials (mono- and di-2-ethylhexyl phosphate) and the compounds represented by the following formula;

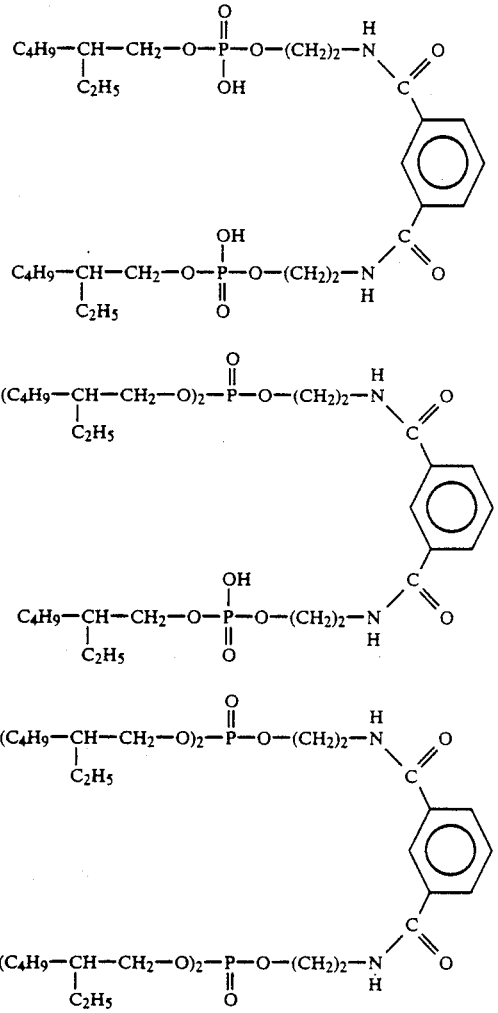

PRODUCTION EXAMPLE 2

A flask equipped with a stirrer and a thermometer was charged with 10 parts by weight of ethyloxazoline, 93.8 parts by weight of mono- and di-nonylphenylphophate having a molar ratio of mono-ester / diester of about 1/1 and an acid value of 201 KOH mg/g and 50 parts by weight of toluene and heated to 80° C. with stirring to form a transparent solution. After reacting at 80° C. for 30 minutes, toluene was removed under reduced pressure to obtain a product of 103.8 parts by weight (acid value 123 KOH mg/g). An IR spectrum shows an absorption of 1,540 cm$^{-1}$ (amide group) to find that the product is a mixture of the staring materials (mono- and di-nonylphenyl phosphate) and the compounds represented by the following formula;

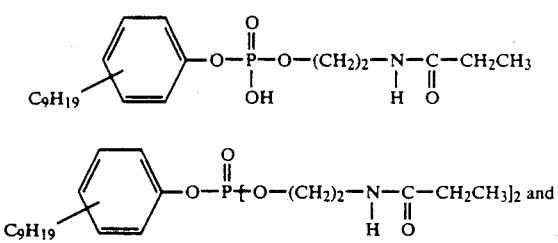

-continued

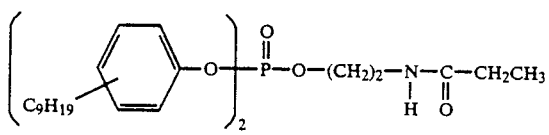

PRODUCTION EXAMPLE 3

A flask equipped with a stirrer and a thermometer was charged with 93 parts by weight of laurylamine and 93 parts by weight of ethyleneglycol monoethyl ether and heated to 80° C. Then, 117 parts by weight of Vini-eight (bisfluoroethylvinylphosphate available from Daihachi Chemical Co., Ltd.) was added dropwise thereto for 30 minutes and reacted for 3 hours. After cooling, 300 parts by weight of a 10% sodium hydroxide solution was added and kept at 100° C. for 2 hours to hydrolize it. The resultant mixture was concentrated, to which 500 parts by weight of water and 500 parts by weight of toluene were added and then neutralized with a 10% hydrochloric acid solution. The aqueous layer was removed and the organic layer was concentrated to obtain 2-laurylaminoethylphosphonic acid monomer chloroethyl ester.

Next, the obtained ester and 51 parts by weight of triethylamine were dissolved in 150 parts by weight of tetrahydrofuran and cooled −20° C. As keeping at −20° C., 81 parts by weight of n-ocanoyl chloride was added dropwise. After the completion of the addition, it was mixed for one hour in an ice bath, and a hydrochloric acid salt of triethylamine was deposited as the reaction progressed. It was then reacted for 2 hours and, after terminating the reaction, the salt was removed by filtering and tetrahydrofuran was removed under reduced pressure to obtain 226 parts by weight of the following ester;

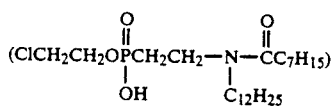

EXAMPLE 1

The phosphorus compound obtained in Production Example 1 of 10 parts by weight was dissolved in 300 parts by weight of acetone, to which 75 parts by weight of aluminum paste (available from Asahi Kasei Co., Ltd as MC-666 of Al content 65%) was dispersed. After mixing for one hour at room temperature, the slurry was concentrated to obtain an aluminum pigment composition of metal content of 65%.

EXAMPLE 2

An aluminum pigment composition having a metal content of 65% was prepared as generally described in Example 1 with the exception that the 10 parts by weight of the phosphorus compound obtained in Production Example 2 was employed instead of the phosphorus compound obtained in Production Example 1.

EXAMPLE 3

An aluminum pigment composition having a metal content of 65% was prepared as generally described in Example 1 with the exception that the 10 parts by weight of the phosphorus compound obtained in Production Example 3 was employed instead of the phosphorus compound obtained in Production Example 1.

PRODUCTION EXAMPLE 4

Preparation of a resin for metallic paint

A one liter flask equipped with a stirrer, a temperature controller and a condenser was charged with 76 parts by weight of ethyleneglycol monobutyl ether, to which 61 parts by weight of a monomer solution which contained 45 parts by weight of styrene, 63 parts by weight of methyl methacrylate, 48 parts by weight of 2-hydroxyethyl methacrylate, 117 parts by weight of n-butyl acrylate, 27 parts by weight of methacrylic acid and 3 parts by weight of azobisisobutylonitrile was added and heated to 120° C. with stirring. Then, 245 parts by weight of the monomer solution mentioned above was added dropwise for 3 hours and stirred for another hour. To the mixture, 28 parts by weight of dimethylethanolamine and 200 parts by weight of deionized water were added to obtain an acryl resin varnish which had a non-volatile content of 50%, a number average molecular weight 12,000 an OH value of 70 and an acid value of 58. A curing agent, 30 parts by weight of Cymel 303 (methoxylated methylolmelamine a available from Mitsui Toatsu Co., Ltd.) was added to 140 parts by weight of the resin varnish.

Preparation of a Water Borne Metallic Pain

Three water borne metallic paints were prepared by respectively mixing 10 parts by weight of the aluminum pigment compositions of Examples 1 to 3 with 170 parts by weight of the above obtained resin varnish, followed by diluting with deionized water up to a No.4 Ford Cup viscosity of 25 to 30 second (20° C.). The paints did not produce hydrogen gas after allowing to stand at 50° C. for 10 days.

PRODUCTION EXAMPLE 5

Preparation of a Water Borne Clear Paint

A polymer was prepared as generally described in Production Example 4, using butyl diglycol as a solvent and a monomer solution which contained 65.8 parts by weight of n-butyl acrylate, 11.8 parts by weight of methyl methacrylate, 16.2 parts by weight of 2-hydroxyethyl methacrylate, 6.1 parts by weight of methacrylic acid and 5 parts by weight of azobisisobutylonitrile. The obtained resin was neutralized 100% with dimethylethanolamine and had an OH value of 70 and an acid value of 40. The obtained resin varnish was mixed with a curing agent (Cymel 303) in a solid content ratio of 70/30, and diluted with deionized water up to a No.4 Ford Cup viscosity of 30 to 35 seconds (20° C.) to obtain a water borne clear paint.

APPLICATION EXPERIMENT 1

A polished mild steel panel which had been degreased was electrocoated with an electrocoating paint for automobiles and baked. The panel was then intercoated with an intercoating paint for automobiles.

The intercoated steel panel was coated with the water borne metallic paint of Production Example 4 and then clear-coated with the clear paint of Production Example 4 by spray coating at 2320 C. and a relative humidity of 60% to form a dried metallic layer of 20 microns and a dried clear layer of 30 microns. The water borne metallic paint was coated in two stages and in an interval of one minute and, after drying for 5 minutes, the clear paint was coated one stage and then a setting of 7 minutes was conducted. The coated panel was then baked at 150° C. for 20 minutes to obtain a sample panel. The adhesive properties and water resistance of the coatings were evaluated and the results are shown in Table 1.

COMPARATIVE EXAMPLE 1

An aluminum pigment paste having a metal content of 65% was prepared as generally described in Example 1 by dissolving 10 parts by weight of laurylphosphate in 300 parts by weight of acetone. An metallic paint and a clear paint were prepared as generally described in Production Example 4 using the above obtained aluminum pigment paste and then coated as generally described in Application Experiment 1. The results are also shown in Table 1.

TABLE 1

|  | Adhesive properties[1] | Water resistance[2] |
|---|---|---|
| Example 1 | Good | Good |
| Example 2 | Good | Good |
| Example 3 | Good | Good |
| Comparative Ex. 1 | Bad | bad |

[1]The coated panel was cross-cutted with a knife and an adhesive tape was put thereon and removed. Good shows no peels and bad shows there are peels.
[2]The coated panel was immersed in a hot water at 500° C. for 10 days and changes of the coating surface were evaluated with eyes. Good shows no changes and bad shows reduced luster.

What is claimed is:

1. A metallic pigment composition comprising a metallic pigment and a phosphorus compound represented by the following formula (I) or (II);

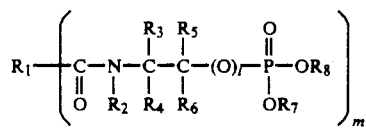

wherein l is 0 or 1, m is an integer of 1 to 4, $R_1$, $R_2$, $R_7$ and $R_8$ represent aliphatic, alicyclic or aromatic hydrocarbon groups, which are the same or different, selected from the group consisting of a hydrogen atom, a $C_1$–$C_{24}$ aliphatic hydrocarbon group, a $C_3$–$C_{24}$ alicyclic hydrocarbon group or a $C_6$–$C_{24}$ aromatic hydrocarbon group, and $R_1$ has a valence of m, $R_3$, $R_4$, $R_5$ and $R_6$, which are the same or different, represent a $C_1$–$C_3$ aliphatic hydrocarbon group or a $C_6$ or $C_7$ aromatic hydrocarbon group,

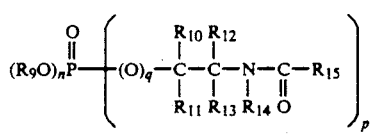

wherein n is 0, 1 or 2, p is an integer of 1 to 3, n+p equals 3, q is 0 or 1, $R_9$, $R_{14}$ and $R_{15}$, which are the same or different, represent a hydrogen atom, a $C_1$–$C_{24}$ aliphatic hydrocarbon group, a $C_3$–$C_{24}$ alicyclic hydrocarbon group or a $C_6$–$C_{24}$ aromatic hydrocarbon group, $R_{10}$, $R_{11}$, $R_{12}$ and $R_{13}$, which are the same or different, represent a $C_1$–$C_3$ aliphatic hydrocarbon group or a $C_6$ or $C_7$ aromatic hydrocarbon group;

said phosphorus compound being present in an amount of 0.5 to 200 parts by weight based on 100 parts by weight of the metallic pigment.

2. The metallic pigment composition according to claim 1 wherein said phosphorus compound (I) or (II) is prepared according to the following chemical equations [A], [B] or [C];

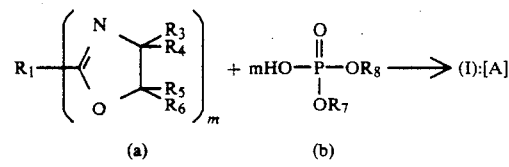

wherein $R_1$, $R_3$–$R_8$ and m are the same as mentioned above, $R_2$ is a hydrogen atom and l is 1,

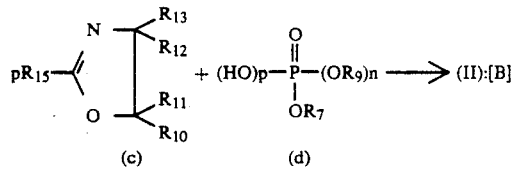

wherein $R_9$–$R_{13}$, n and p are the same as mentioned above, $R_{14}$ is a hydrogen atom and q is 1,

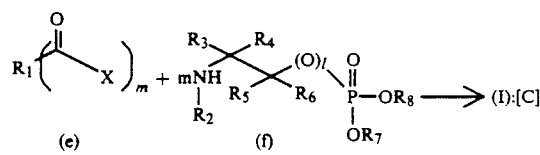

wherein $R_1$–$R_8$, l and m are the same as mentioned above, and X is a halogen atom.

3. The metallic pigment composition according to claim 1 wherein said phosphorus compound (II) is prepared according to the following reaction equation [D];

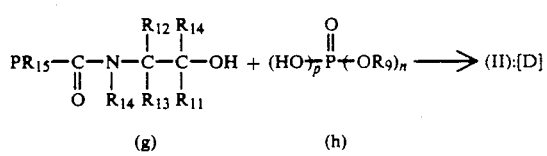

wherein $R_9$ to $R_{15}$, n and p are the same as mentioned above and q=1.

4. The metallic pigment according to claim 1 wherein said metallic pigment is selected from the group consisting of aluminum flakes or aluminum alloy flakes.

5. A water borne metallic coating composition comprising the metallic pigment composition according to any one of claims 1 to 4 and an aqueous film forming polymer.

6. The water borne metallic coating composition according to claim 5 wherein said aqueous film forming polymer is an acryl resin.

* * * * *